April 26, 1938.  H. H. MAPELSDEN  2,115,495
BUSHING
Filed May 16, 1936
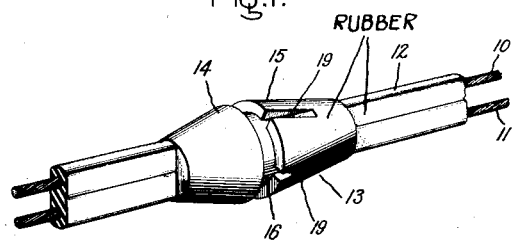
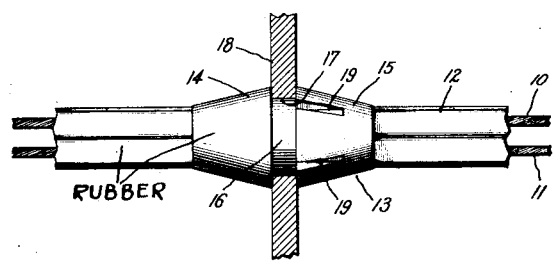
Inventor:
Harold H. Mapelsden,
by Harry E. Dunham
His Attorney.

Patented Apr. 26, 1938

2,115,495

UNITED STATES PATENT OFFICE 2,115,495

BUSHING

Harold H. Mapelsden, Bridgeport, Conn., assignor to General Electric Company, a corporation of New York Application May 16, 1936, Serial No. 80,103

8 Claims. (Cl. 173—322)

My invention relates to a bushing for an electric cable.

An object of my invention is to provide an improved bushing and strain relief for an electric cable.

What I consider to be novel and my invention will be better understood by reference to the following specification and appended claims when considered in connection with the accompanying drawing, in which Fig. 1 is a perspective view of my improved bushing secured to a cable, and Fig. 2 is a side elevation of the bushing located in position in a plate.

Referring to the drawing, 10 and 11 indicate two stranded electric conductors provided with a common body of insulation 12. In the connection of such a cable to a radio or the like, it is necessary to provide a strain relief and bushing so that a strain placed on the cable will not be transmitted to the device to which it is connected and also so that the cable insulation will not be injured by rubbing against the opening through which it passes. It has been previous practice to provide this strain relief by knotting the cord or cable on both sides of a plate through which it passes. It is a rather difficult practice to make these knots expertly so that the cord cannot be pulled in either direction and the result is not always entirely satisfactory. To overcome the difficulties of this prior practice and to provide a strain relief and bushing efficient in operation which facilitates the securing of the cord, I have provided a molded strain relief and bushing 13 which may be secured directly to the insulation 12 of the cord in the molding operation. Strain relief 13 consists of two parts 14 and 15 which, as shown, are of increasing diameter from the two ends toward the center. At the center of strain relief 13 an annular recess 16 is provided. The recess 16 is of substantially the same diameter as the opening 17 of a plate 18 through which the cord passes. To facilitate the pulling of the cord through the opening 17 without damage to the strain relief 13, longitudinal recesses 19 are provided in the part 15. When the cord is pulled through the opening 17 the rubber is compressed and may extend into these longitudinal recesses 19 until the member 13 is in position with the recess 16 located in the opening 17. When in this position, a strain placed on either end of the cord will not be transmitted by the cord to the opposite end. The strain member 13 may readily be molded about the cord with a minimum of labor and time and may be expeditiously positioned by pulling the cord through the opening of a plate.

From the foregoing it may be seen that an improved bushing and strain relief for a cord is provided which may be manufactured economically and inserted in position with a minimum of labor.

What I claim as new and desire to secure by Letters Patent of the United States is:

1. The combination with an electric conductor of a bushing and strain relief attached directly thereto and forming an integral part thereof comprising resilient material of increasing diameter toward the center having a perimetrical recess at the center, and longitudinal recesses in one end to adapt the bushing for insertion in an opening of substantially the same size as the recess at the center.

2. The combination with an electric cord of a bushing and strain relief of resilient material secured directly to the cord, having an annular recess at the center and longitudinal recesses in one end to permit its passage through an opening of substantially the same size as the center.

3. A bushing of resilient material molded on an electric cord with a perimetrical recess at the center and with longitudinal recesses in one end to facilitate passage of the bushing through an opening of the same size as the center recess.

4. The combination with an electric conductor of a bushing of resilient material attached to and forming a part of the conductor, said bushing having a central perimetrical recess and being tapered away from the central recess with longitudinal slots in one end to facilitate the insertion of the conductor and bushing in an opening of the same size as the central recess.

5. An electric cord having a bushing of resilient material molded directly thereon, said bushing being tapered from the central portion and having a perimetrical central recess, and longitudinal recesses in one end to facilitate the passage of the bushing through an opening of the same diameter as the central recess.

6. An electric conductor having a bushing of resilient material attached thereto and forming a part thereof, comprising walls which form two longitudinally spaced abutments to provide an annular groove therebetween, one of said walls being recessed longitudinally to permit of the insertion of the bushing into an opening in a support.

7. The combination with an electric conductor having a covering of insulating material thereon, of a bushing of resilient material attached to said covering and forming a part thereof comprising walls which form two longitudinally spaced abutments to provide a perimetrical groove therebetween, one of said walls tapering longitudinally of the conductor in a direction away from said groove whereby it may be pulled through an opening in a support of a diameter equal substantially to the diameter of the groove, the material of said wall yielding and being compressed to permit passage through such an opening.

8. In combination, an electric conductor having a covering of resilient insulating material thereon, a wall attached to said covering and forming a part thereof which presents a flat end face to form an abutment, and a second wall of resilient material attached to said covering and forming a part thereof, said second wall having a flat end which is opposed to and is in spaced relation to said abutment whereby said walls define a perimetrical groove around the conductor, said second wall tapering longitudinally of the conductor in a direction away from said annular groove whereby it is adapted to yield so that it may be pulled through an opening in a supporting member of a diameter equal substantially to the diameter of said groove.

HAROLD H. MAPELSDEN.